US 6,570,865 B2

(12) United States Patent
Masui et al.

(10) Patent No.: US 6,570,865 B2
(45) Date of Patent: *May 27, 2003

(54) CDMA MOBILE COMMUNICATIONS SYSTEM AND COMMUNICATION METHOD

(75) Inventors: Hironari Masui, Yokohama (JP); Yasuo Ohgoshi, Yokohama (JP); Takashi Yano, Tokorozawa (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/881,124

(22) Filed: Jun. 15, 2001

(65) Prior Publication Data

US 2001/0033559 A1 Oct. 25, 2001

Related U.S. Application Data

(63) Continuation of application No. 09/511,769, filed on Feb. 24, 2000, now Pat. No. 6,393,013, which is a continuation of application No. 08/690,819, filed on Aug. 1, 1996, now Pat. No. 6,269,088.

(30) Foreign Application Priority Data

Aug. 10, 1995 (JP) ............................................. 7-204232

(51) Int. Cl.[7] .............................................. H04B 7/216
(52) U.S. Cl. ........................ 370/342; 370/335; 370/348
(58) Field of Search ................................ 370/335, 342, 370/336, 337, 341, 343, 344–348, 329; 455/450–452, 455

(56) References Cited

U.S. PATENT DOCUMENTS 4,866,788 A 9/1989 Mouly et al.
5,278,833 A 1/1994 Crisler et al. ............... 370/348
5,329,530 A 7/1994 Kojima ....................... 370/348
5,357,513 A 10/1994 Kay et al. ................... 370/348
5,371,780 A 12/1994 Armitay ..................... 370/342
5,410,568 A 4/1995 Schilling .................... 370/335
5,426,666 A 6/1995 Kato
5,481,533 A 1/1996 Honig et al. ................ 370/335
5,491,718 A 2/1996 Gould et al. ................ 375/205
5,491,741 A 2/1996 Farwell et al. .............. 370/347
5,509,015 A 4/1996 Tiedemann, Jr. et al. ... 370/348
5,511,067 A 4/1996 Miller ........................ 370/335
5,511,068 A 4/1996 Sato .......................... 370/335
5,533,013 A 7/1996 Leppanen ................... 370/342

(List continued on next page.)

FOREIGN PATENT DOCUMENTS

| JP | 5888938 | 5/1983 |
|----|---------|--------|
| JP | 6090442 | 5/1985 |
| JP | 2220526 | 9/1990 |
| JP | 3214825 | 9/1991 |
| JP | 6311160 | 11/1994 |
| JP | 738496  | 2/1995 |

OTHER PUBLICATIONS

IEEE Trans. On Communication, Packet Switching in Radio Channels, COM–24, 8(1976) pp. 832–845.

*Primary Examiner*—Steven Nguyen
(74) *Attorney, Agent, or Firm*—Antonelli, Terry, Stout & Kraus, LLP

(57) ABSTRACT

A radio communication system having a base station and a plurality of radio terminals, wherein each radio terminal having a transmission request transmits a reservation packet at arbitrary timing through a reservation channel in accordance with a CDMA scheme, and the base station assigns a traffic channel and a time slot to be used to each radio terminal requesting a reservation through a reply packet outputted onto a reply channel. On the reservation channel, a short spreading code corresponding to a matched filter is applied.

10 Claims, 14 Drawing Sheets

U.S. PATENT DOCUMENTS

| | | | |
|---|---|---|---|
| 5,546,444 A | 8/1996 | Roach, Jr. et al. | 455/412 |
| 5,559,790 A | 9/1996 | Yano et al. | 370/342 |
| 5,559,804 A | 9/1996 | Amada et al. | 370/347 |
| 5,568,472 A | 10/1996 | Umeda et al. | 370/342 |
| 5,581,547 A | 12/1996 | Umeda et al. | 370/342 |
| 5,596,571 A | 1/1997 | Gould et al. | 370/335 |
| 5,673,259 A | 9/1997 | Quick, Jr. | 370/342 |
| 5,784,403 A | 7/1998 | Scott | 375/207 |
| 5,790,551 A | 8/1998 | Chan | 370/348 |
| 5,802,465 A | 9/1998 | Hamalainen | 455/403 |
| 5,828,662 A | 10/1998 | Jalali | 370/335 |
| 6,269,088 B1 * | 7/2001 | Masui et al. | 370/335 |

* cited by examiner

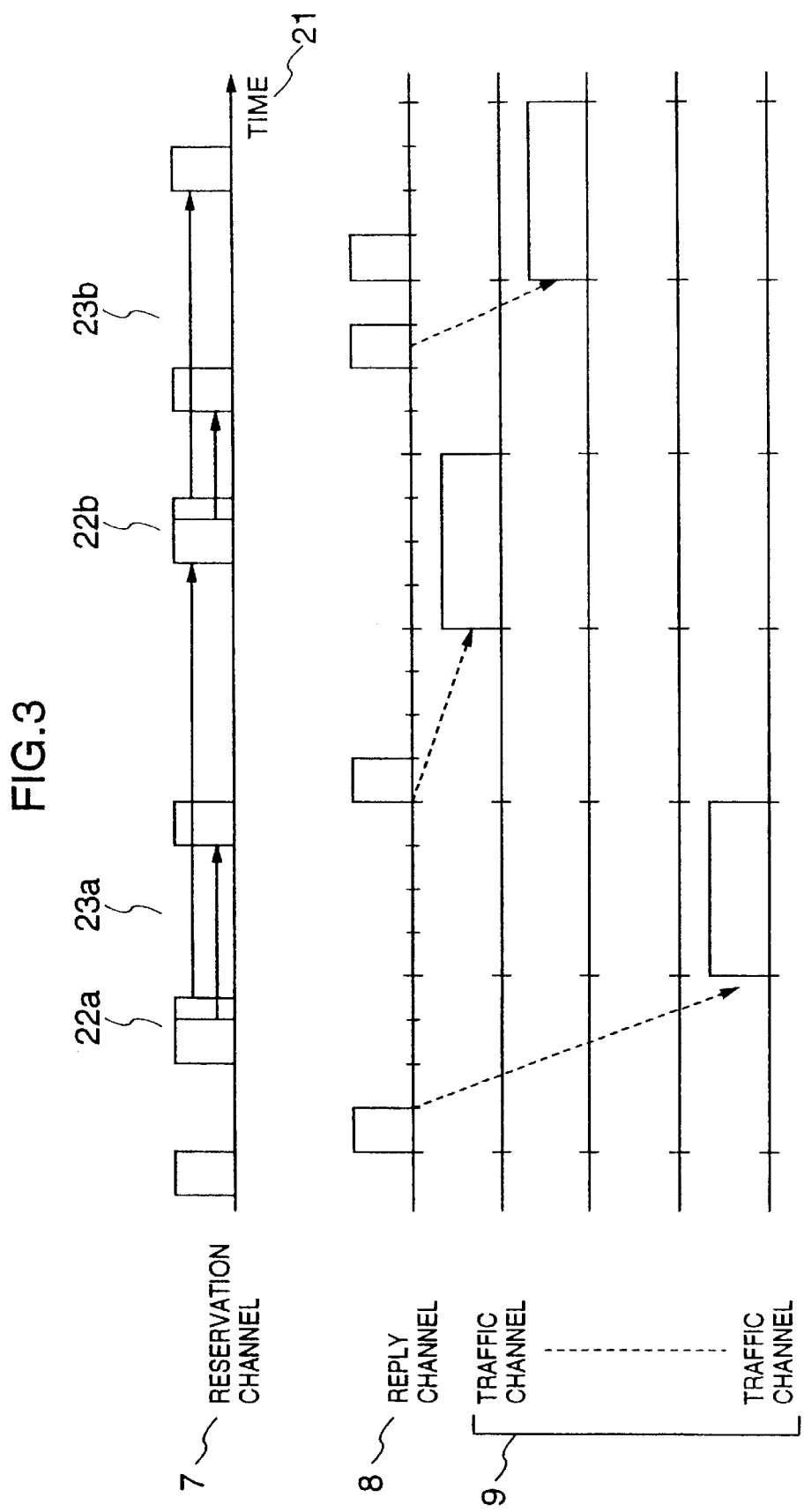

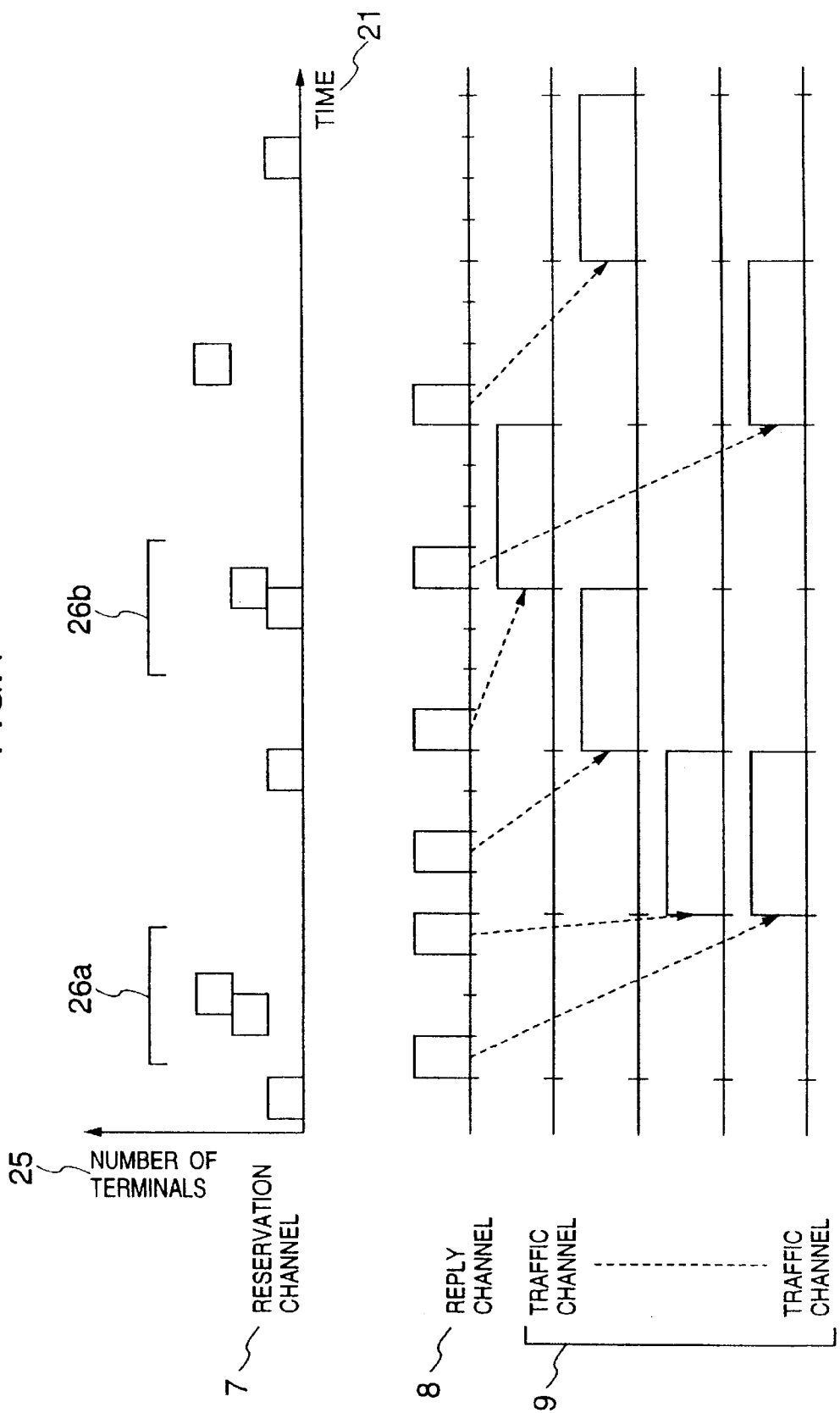

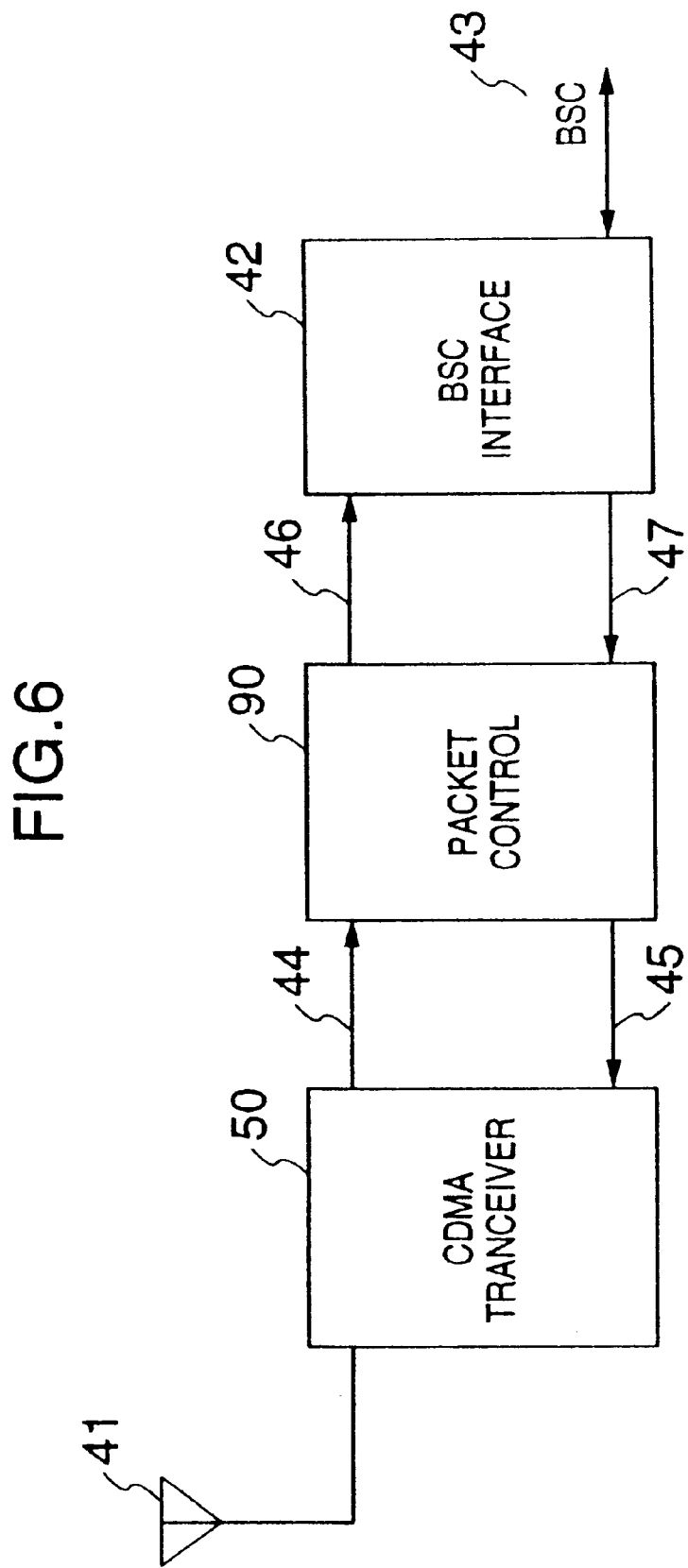

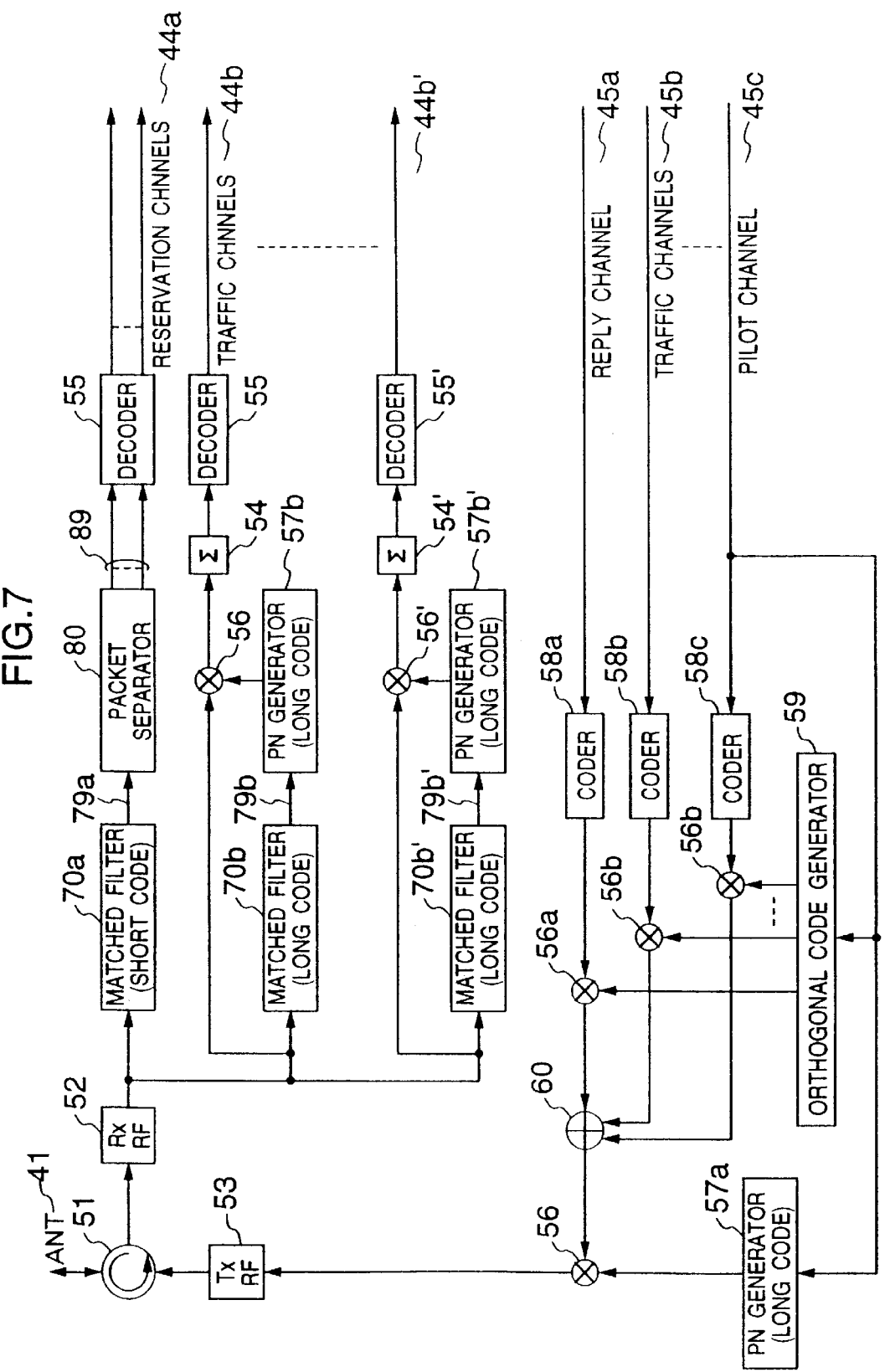

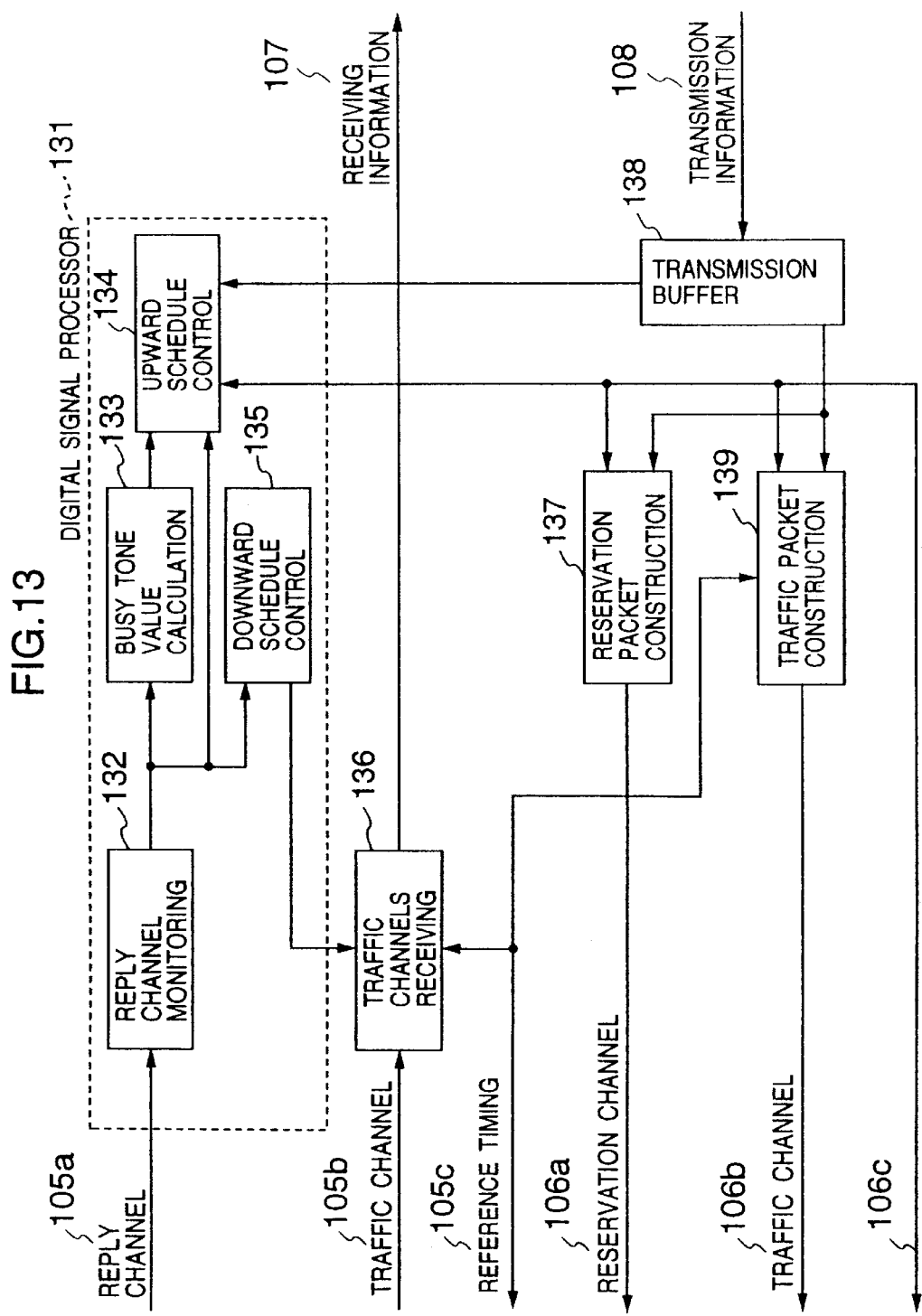

CDMA MOBILE COMMUNICATIONS SYSTEM AND COMMUNICATION METHOD

This is a continuation of application Ser. No. 09/511,769, filed Feb. 24, 2000, now U.S. Pat. No. 6,393,013; which is a continuation of application Ser. No. 08/690,819, filed Aug. 1, 1996, now U.S. Pat. No. 6,269,088.

BACKGROUND OF THE INVENTION

1. Field of the Invention

The present invention relates to a mobile communication system and a communication method, and more particularly, to a reservation based mobile communication system, mobile terminal equipment, and communication method to which code division multiple access (CDMA) is applied.

2. Description of the Related Art

Conventionally, a mobile communication system which employs a reservation based access control in a frequency division multiple access (FDMA) scheme is known, for example, as described in IEEE Transactions on Communications, Packet Switching in Radio Channels: "Part3-Polling and (Dynamic) Split-Channel Reservation Multiple Access", COM-24, 8, (1976), pp. 832–845 (hereinafter called "prior art publication 1").

In the reservation based access control, each of mobile terminals having a request for data transmission reserves a traffic channel to a base station through a reservation packet. The base station, after scheduling traffic channels and transmission timing (time slots) to be assigned to these mobile terminals, notifies each of the mobile terminals of transmission timing to be used on an assigned traffic channel through a reply packet. According to this reservation based access control, collision of packets on the traffic channel can be basically avoided.

As another example of reservation based control type communication system, for example, JP-A-6-311160, corresponding to U.S. patent application Ser. No. 08/230773 (hereinafter called "prior art publication 2") has proposed such a communication system based on a time division multiple access scheme.

However, in the mobile communication systems in which the reservation based access control is applied to FDMA and TDMA schemes, as proposed by prior art publications 1 and 2, since respective mobile terminals send reservation packets through a reservation channel asynchronously with each other, a plurality of reservation packets can collide with a high possibility. Thus, repetitive retransmission of reservation packets obliged by the collision of packets constitutes a main cause of degrading the throughput of the entire communication system.

Meanwhile, as a standard for FPLMTS (Future Public Land Mobile Telecommunication Systems), the adoption of the code division multiple access scheme is regarded as promising. A CDMA mobile communication system has been proposed, for example, in JP-A-7-38496 corresponding to U.S. patent application Ser No. 08/375679 (hereinafter called "prior art publication 3"). However, prior art publication 3 does not provide any useful information for solving the problem of a degraded throughput in the reservation based access control.

SUMMARY OF THE INVENTION

It is an object of the present invention to provide a mobile communication system and a communication method which employ a reservation based access control to realize a high throughput.

It is another object of the present invention to provide CDMA mobile terminal equipment and base station which solve the problem of collision of reservation packets to realize a high throughput.

To achieve the above objects, in a mobile communication system of the present invention, radio channels include a plurality of traffic channels used for transmitting upward data packets directed from mobile terminals to a base station and for transmitting downward data packets directed from the base station to the mobile terminals, a reservation channel used for transmitting reservation packets each indicative of a traffic channel assignment request from a mobile terminal to the base station, and a reply channel used for transmitting reply packets each indicative of a traffic channel through which data is transmitted and received from the base station to a mobile terminal, wherein the reservation, reply and traffic channels are applied with spread-spectrum in accordance with a CDMA scheme. The mobile communication system is characterized in that a mobile terminal having a request for data transmission transmits a reservation packet onto the reservation channel at arbitrary timing, the base station specifies a traffic channel and a time slot to be used by the requesting mobile terminal by a reply packet transmitted through the reply channel, and each mobile terminal transmits and receives a data packet in the time slot on the traffic channel, both specified by the reply packet.

Describing in greater detail, each of the reservation, reply and traffic channels is assigned a unique spreading code, for example, pseudonoise (PN). Particularly, the reservation channel is assigned a spreading code shorter than those assigned to other reply and traffic channels. The base station relies on a matched filter to identify a plurality of reservation packet signals having time-overlapped portions, transmitted from a plurality of mobile terminals, and to perform a receiving process on bit signals corresponding to each packet.

According to a preferred embodiment of the present invention, the base station, upon receiving a reservation packet from a mobile terminal, assigns a time slot on a traffic channel in accordance with a schedule control, and notifies each mobile terminal of the assignment result through a reply packet.

Also, for regulating a total number of simultaneously communicated packets, the base station periodically transmits a busy tone signal indicative of a traffic situation, such that each mobile terminal having a request for data transmission performs a reservation packet transmission control in accordance with the busy tone signal. Alternatively, the radio channels may be provided with a plurality of reply channels so as to specify a reply channel for each mobile terminal to receive the busy tone signal therethrough.

According to the present invention, time slots are defined in the traffic channels such that each mobile terminal transmits and receives data in a particular time slot specified by the base station. The reservation channel, on the other hand, is not provided with time slots, so that each mobile terminal having a request for data transmission transmits a reservation packet at arbitrary timing, thus facilitating the operation of transmitting the reservation packet in each mobile terminal.

Also, each mobile terminal performs a spectrum spreading or multiplies the reservation packet by a spreading code to generate a spread-spectrum reservation packet, where the spreading code has a period shorter than that applied to a data packet transmitted through a traffic channel, while the base station receives reservation packets using a matched filter.

In this case, even if two or more spread-spectrum control packets, modulated by the same spreading code, are partially overlapped on the time axis, the matched filter can identify received packets, provided that there is a timing deviation over one chip or more on the spreading code between the respective packets. Therefore, even if a plurality of mobile terminals generate reservation packets individually at arbitrary timing, a reception disabled condition caused by collision of these packets will occur with an extremely low possibility.

The foregoing and other objects, advantages, manner of operation and novel features of the present invention will be understood from the following detailed description when read in conjunction with the accompanying drawings.

BRIEF DESCRIPTION OF THE DRAWINGS

FIG. 3 is a diagram for explaining a channel access control in a conventional radio communication system;

FIG. 4 is a diagram for explaining a channel access control in a radio communication system according to the present invention applying a CDMA scheme;

FIG. 6 is a block diagram illustrating the configuration of a base station;

FIG. 7 is a block diagram illustrating the configuration of a CDMA transceiver 50 in the base station;

FIG. 13 is a block diagram illustrating the configuration of a packet controller 130 in the mobile terminal.

DESCRIPTION OF THE PREFERRED EMBODIMENTS

Figure 1:
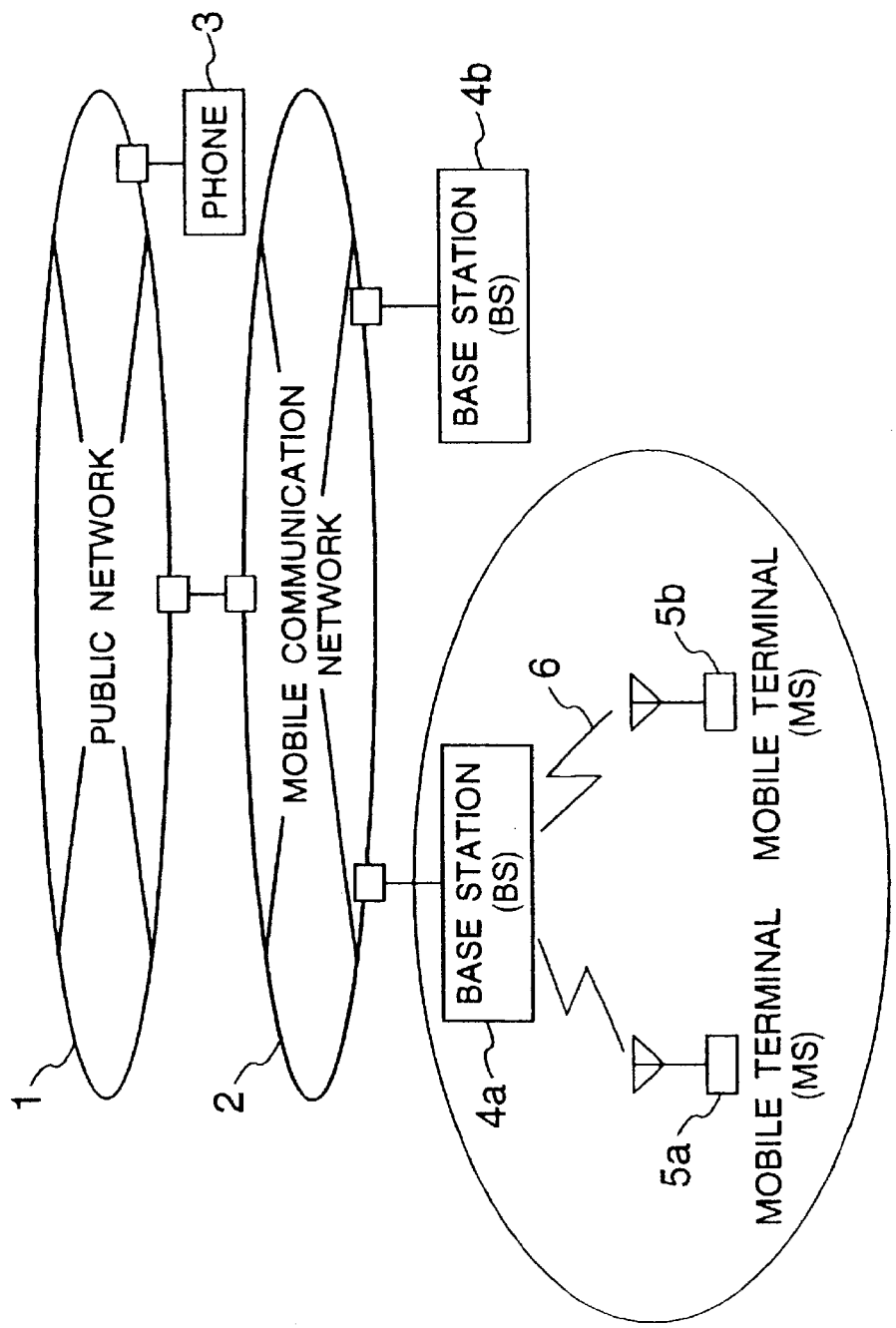
FIG. 1 illustrates an exemplary configuration of a mobile communication network to which the present invention is applied.

FIG. 1 illustrates an exemplary configuration of a mobile communication network to which the present invention is applied.

The illustrated mobile communication network comprises a public network 1 accommodating stationary terminals such as a telephone 3 or the like; and a mobile communication network 2 connected to the public network 1 and accommodating a plurality of base stations 4 (4a, 4b, ...), wherein each base station 4 communicates with mobile terminals (radio terminals) 5 (5a, 5b, ...) located in its service area (cell) through radio channels 6. On the radio channel, a CDMA packet transmission is applied because of its suitability to communications of multi-media information in which data, sound and image signals are mixed.

Figure 2A:
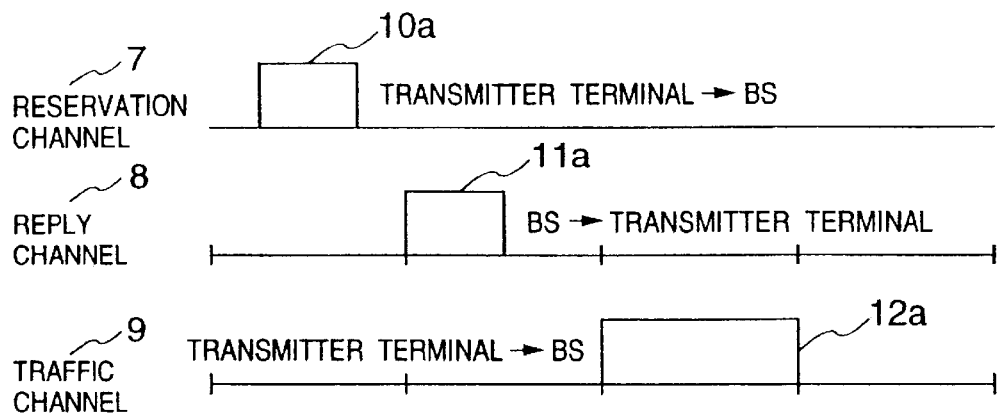
FIG. 2A is a diagram for explaining a protocol for a call set up process in a radio communication system according to the present invention.

FIG. 2A shows a protocol for a call set up process in the radio communication system according to the present invention.

The call set up process includes two different sequences of operations: one is a sequence of operations for initially allocating local ID's (local addresses) to mobile terminals in a service area, and the other is a sequence of operations for allocating a link number to each mobile terminal for communicating with another destination terminal. The local ID is an address number having a reduced length than that of a unique address previously assigned to each mobile terminal. The use of this local ID results in reducing the length of a packet. The link number also has a similar effect to the local ID.

A procedure of the call set up process is common to the above-mentioned sequences of operations for allocating the local ID's and for allocating the link numbers. Specifically, the procedure comprises the steps of transmitting a control packet (reservation packet) 10a for call set up from a terminal to a base station through a reservation channel 7; transmitting a control packet (reply packet) 11a from the base station to the terminal through a reply channel 8; and transmitting a call set up data packet 12a from the base station to the terminal through a traffic channel.

Address information indicative of a source is set in the control packet 10a. Also, the address of a terminal required to receive the data packet 12a and a time slot on the traffic channel 9 in which the data packet 12a is to be received, are specified by the control packet 11a, such that the terminal specified by this control packet 11a receives the call set up data packet 12a including location registration information (local ID number) or link information (link number) transmitted by the base station in the specified time slot on the traffic channel 9.

It should be noted that if the control packet 11a has a sufficient length, the location registration information or the link information may be transmitted through the control packet 11a, instead of utilizing the call set up data packet 12a.

The reservation channel 7, reply channel 8, and traffic channels 9 are distinguished by PN codes which are applied to spread-spectrum. A plurality of traffic channels 9 can be formed by providing a plurality of PN codes for transmitting data packets.

The base station is provided, for example, with a management table for indicating a slot using situation on each traffic channel such that the base station schedules a slot for transmitting the data packet 12a so as to minimize a waiting time of the terminal by referring to this management table.

Figure 2B:
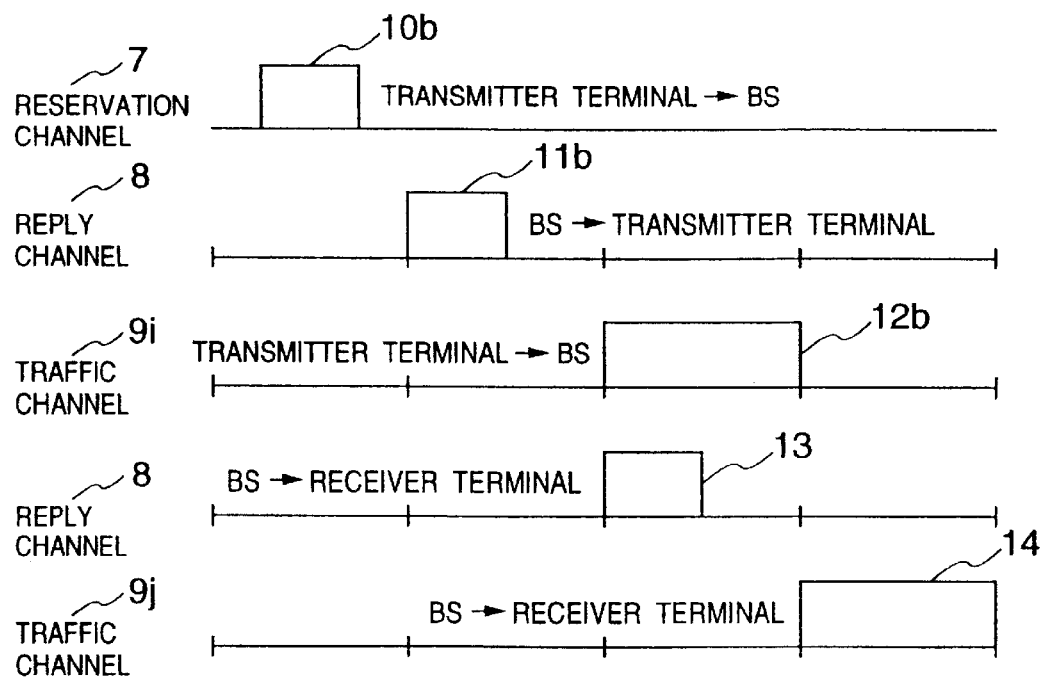
FIG. 2B is a diagram for explaining a protocol for information transmission in the radio communication system according to the present invention.

FIG. 2B shows a protocol for transmitting user information (hereinafter simply called the "data").

A terminal (transmitting terminal) having a request for data transmission utilizes a PN code for the reservation channel 7 to transmit a control packet (reservation packet) 10b for requesting the assignment of a slot in which a data packet is to be transmitted. The base station, in response to this request, utilizes a PN code for the response channel 8 to transmit a control packet (reply packet) 8b to the request transmitting terminal, thereby specifying a traffic channel 9i and a time slot to be used by the request transmitting terminal. The request transmitting terminal, upon receiving the reply packet 11b, sends the data packet 12b at the timing of a specified time slot on the traffic channel 9i.

The data packet 12b is once received by the base station. The base station confirms a destination address of the data packet, and utilizes the PN code for the reply channel 8 to transmit a control packet 13 for specifying a destination terminal (receiving terminal) as well as a traffic channel 9j and a time slot with which the receiving terminal is to receive the data packet 12b, when the receiving terminal is a mobile terminal located in the service area of the base station. Then, the base station sends the received data packet 12b from the request transmitting terminal as a data packet 14 in the specified time slot. The receiving terminal receives the data packet 14 transferred from the base station in the specified time slot on the traffic channel 9j specified by the control packet 13.

According to the information transmission protocol described above, while a data transfer in the upward direction from a transmitting terminal to a base station requires a reservation packet, a data transfer in the downward direction from the base station to a receiving terminal does not require the reservation packet.

The base station provides each mobile terminal with reference timing in data packet transmission/reception operations using a pilot signal transmitted through a pilot channel in parallel with the transmission of the data packet 14. Since each mobile terminal can receive the data packet 14 and the pilot signal transmitted from the base station with the same delay time, the mobile terminal can readily accomplish synchronization acquisition, when receiving the data packet 14, by determining the timing of a receiving time slot based on the pilot signal.

FIG. 3 shows a reservation based access control in a conventional FDMA radio communication system.

As described above in connection with FIG. 2A, the reservation based access control is a control method in which a reservation packet is sent prior to the transmission of a data packet, and the data packet is transmitted after the reservation is established. For this control, the reservation channel 7 and the reply channel 8 are provided in addition to the traffic channels 9. The channels may be divided in accordance with the time division multiple access (refer to the prior art 2) other than the frequency division multiple access (refer to the prior art 1) shown in FIG. 3.

In FIG. 3, the abscissa represents the time axis 21. When a radio terminal transmits a reservation packet to a base station through the reservation channel 7, the base station schedules time slots on the traffic channels, and transmits a reply packet indicative of a reservation result to the radio terminal through the reply channel 8.

In the conventional reservation based access control, if a plurality of radio terminals transmit reservation packets onto the reservation channel 7 at a time, the reservation packets may collide with each other and collapse, as indicated by 22a, 22b in FIG. 3, with the result that the base station cannot receive the reservation packets. Each radio terminal determines that its reservation packet would have collided with any other reservation packet on the reservation channel if a reply packet destined thereto has not been returned in a predetermined time period after the radio terminal had sent the reservation packet. In this event, the radio terminal again transmits the reservation packet (indicated by 23a, 23b). Thus, the throughput in a radio communication system employing the conventional reservation based access control is limited depending on the collision of reservation packets as described above.

FIG. 4 shows an access control in a reservation based CDMA radio communication system according to the present invention.

The present invention applies CDMA packet transmission to a reservation channel to allow a plurality of radio terminals to transmit reservation packets individually at arbitrary timing.

In a reservation channel 7 illustrated in FIG. 4, the ordinate represents transmitting terminals 25. FIG. 4 represents a situation in which the transmitting terminals 25 have transmitted reservation packets partially overlapped on the time axis 21.

In the CDMA scheme, the spread-spectrum is applied by replacing each symbol (bit "1" and "0") in transmitted data with a spreading code (orthogonal code or PN code) composed of a plurality of chips having unique patterns. For example, in a direct sequence spread-spectrum, a plurality of transmitting terminals modulate transmission data using the same PN (pseudonoise) sequence, and transmit the spread-spectrum data at the same carrier frequency. In this event, if there is a time deviation of one chip or more in transmission timing between respective symbols in data, the receiving side can individually identify each of transmitted data.

If a plurality of reservation packets are transmitted at completely the same timing, the packets will collide, whereby destinations will fail to receive the reservation packets. However, generally, such transmission of a plurality of reservation packets at completely the same transmission timing is rather a rare case. In the spread-spectrum, even if two packets are time-overlapped, the collision is avoided when these packets are deviated in timing by a time equal to or longer than one chip, as indicated by 26a, 26b in FIG. 4, thus eliminating the need to retransmit the reservation packets. It will be appreciated that the reservation based control scheme according to the present invention significantly improves the throughput compared with the conventional reservation based communication system.

In the present invention, each radio terminal having a request for data transmission transmits a reservation packet at arbitrary timing on the reservation channel, and sends a data packet in a time slot on a traffic channel, both specified by a reply packet received through the reply channel.

The data packet is transmitted in units of time slot in principle. When transmission data is so long that a plurality of time slots are required for the transmission, the data is divided into a plurality of data packets, and a time slot is reserved for each data packet. However, for reducing overhead due to the reservation process, a plurality of time slots may be reserved by a single reservation packet such that a base station, in response to the reservation packet, assigns a plurality of continuous or intermittent time slots to a transmitting terminal by a single reply packet or a plurality of reply packets generated for respective time slots.

While the present invention allows the mobile terminals to transmit reservation packets at arbitrary timing, the mobile terminals must transmit and receive a reply packet and a data packet in synchronism with a time slot having a previously defined constant length.

As illustrated in FIG. 4, the reply channel 8 and the respective traffic channels 9 are divided into-time time slots respectively having a fixed length, and a pilot signal is used to match the timing, thus facilitating fast synchronization of spreading codes between each radio terminal and a base station. More specifically, the base station spreads the pilot signal (reference signal) with a spreading code (PN sequence) having a suitable period, and continuously transmits the spread-spectrum pilot signal on a common channel (pilot channel). Each radio terminal generates a synchronization signal based on the pilot channel despread from the spread-spectrum pilot signal with a PN sequence unique to the pilot channel, and sets a time slot in synchronism with the base station on the reply channel and on each traffic channel.

It should be noted that since the pilot signal is intended for the synchronization of the spreading codes, the pilot signal may include any contents. Thus, for transmitting the pilot signal, the reply channel, for example, may be utilized instead of using the dedicated pilot channel.

Figure 5A:
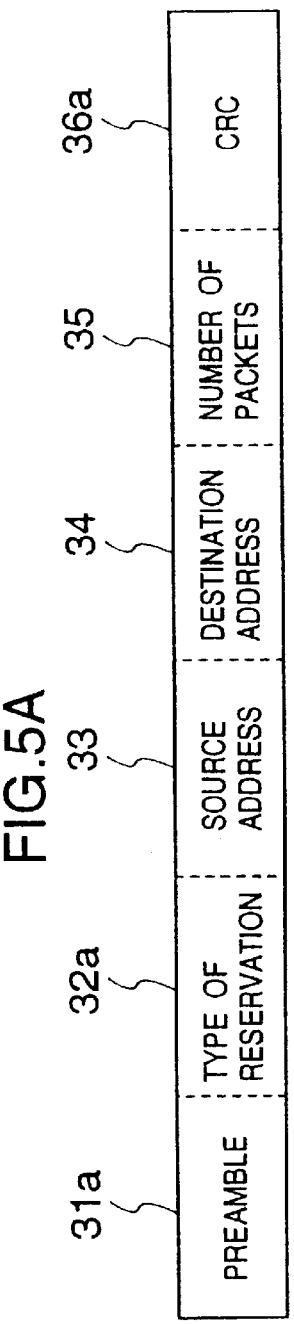
FIG. 5A illustrates a format for a reservation packet.
Figure 5B:
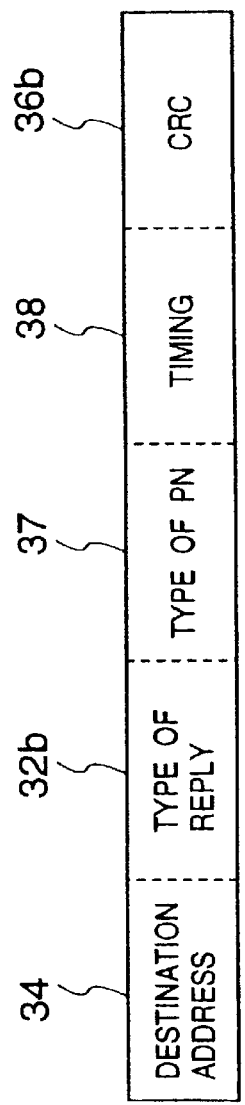
FIG. 5B illustrates a format for a reply packet.
Figure 5C:
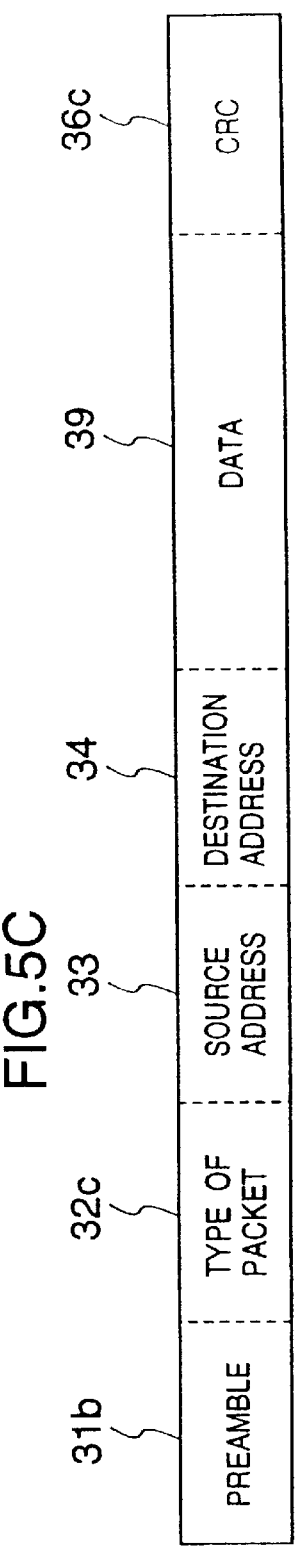
FIG. 5C illustrates a format for an information transmission packet.

FIGS. 5A–5C illustrate formats for the packets used in the mobile communication system according to the present invention.

The reservation packet, as illustrated in FIG. 5A, is composed of a preamble 31a for synchronization acquisition; a type of reservation 432b indicative of the type of the packet (identification code for identifying a location registration packet, a link securing packet, or a traffic channel reserving packet); a source address 33 (using a local ID if the location has been registered); a destination address 34 (using a link number if a link has been secured); a number 35 of reservation desired transmission packets (time slots); and a CRC (Cyclic Redundancy Check) code 36a serving as an error detection code, arranged in this order from the beginning. The number 35 of transmission packets is not required in the call set up process for location registration or link securing.

The reply packet, as illustrated in FIG. 5B, is composed of a source address 34; a type of reply 32b indicative of the type of the packet (for identifying a location registration packet, a link securing packet, an upward direction information transmitting packet or a downward direction information transmitting packet); a PN type 37 indicative of a spreading code of a traffic channel to be sued; timing information 38 indicative of assigned transmission timing (time slot); and a CRC code 36b, arranged in this order from the beginning.

It should be noted that in the present invention, the reply packet does not require a preamble. This is because each radio terminal can acquire each reply packet by receiving the pilot signal and establishing the synchronization of each time slot on the reply channel based on the pilot signal, as described above.

The data packet for transmitting information, as illustrated in FIG. 5C, is composed of a preamble 31b; a type of packet (for identifying a location registration packet, a link securing packet, an upward information transmitting packet, or a downward information transmitting packet) 32c; a source address 33 (using a local ID if the location has been registered); a destination address 34 (using a link number if a link has been secured); data 39 (a PN code for the information transmitting channel or the reply channel, transmission or reception timing, and transmission information); and a CRC code 36c, arranged in this order from the beginning.

Since the reply channel and the traffic channel for transmitting information are respectively divided into packets, it is desirable that the sizes of respective packets be unified to a fixed length even if the types of packets are different. For this purpose, dummy bits may be inserted in a front portion of each packet so as to adjust the beginning position of respective fields subsequent thereto. In the downward data packet, the preamble 31b may be omitted as is the case of the reply packet.

FIG. 6 illustrates a schematic configuration of the base station 4.

The base station 4 comprises an antenna 41; a CDMA transceiver 50; a packet controller 90; a BSC interface 42 connected to a controller (BSC 43) intervening between the base station 4 and the mobile communication network 2.

FIG. 7 illustrates in detail the configuration of the CDMA transceiver 50 in the base station. The CDMA transceiver 50 comprises receiving radio module 52 and a transmitting radio module 53 for modulating and demodulating a baseband signal as well as for transmitting and receiving signals at radio frequencies.

Referring specifically to FIG. 7, a control packet (reply packet) signal transmitted from a base station to a radio terminal is inputted to an encoder 58a through a reply channel signal line 45a, and is subjected to encoding for error correction using, for example, a convolutional code or the like. The encoded reply packet signal is multiplied by an orthogonal code for the reply channel outputted from an orthogonal code generator 59 in a multiplier 56a to generate a spread-spectrum reply packet signal which is then inputted to an adder 60.

Similarly to the reply packet signal, data packet signals outputted to a plurality of signal lines 45b respectively corresponding to traffic channels are encoded in the encoder 58b, and multiplied by orthogonal codes corresponding to respective traffic channels in a multiplier 56b to generate spread-spectrum data packet signals which are then supplied to the adder 60. A pilot signal outputted to a signal line 45c is likewise encoded in an encoder 58c, multiplied by an orthogonal code unique to the plot channel in a multiplier 56c to generate a spread-spectrum pilot signal which is then supplied to the adder 60.

The output of the adder 60 is multiplied by a PN code (long code) unique to each base station outputted from a PN generator 57a in a multiplier 56 to generate a spread-spectrum signal which is subsequently supplied to the transmitting radio module 53.

On the other hand, a received signal processed by the receiving radio module 52 is inputted to a matched filter 70a for the reservation channel and to a plurality of matched filters 70b–70b' respectively corresponding to traffic channels.

The matched filter 70a despreads the received signal with a PN code unique to the reservation channel. The despread signal is separated into a plurality of bit data trains 89 each for a corresponding reservation packet in a packet separation circuit 80. In this case, as described later with reference to FIGS. 8 and 9, if the period of a PN sequence applied to the despreading process is selected to be equal to the number of taps of the matched filter, the outputs of the matched filter can be used as despread results without further processing, thus realizing fast synchronization. Each bit data train for a corresponding reservation packet, separated from other bit data trains in the packet separation circuit 80, is subjected to a decoding process accompanied by error correction, for example, such as Viterbi decoding or the like in a decoder 55a, and subsequently supplied to the packet controller 90.

The matched filters 70b–70b' are provided for acquiring the initial synchronization of PN sequences of received signal son the respective traffic channels. Once the synchronization is acquired, each of the PN generators 57b, 57b' generates a PN sequence for each channel in synchronism with the acquired PN sequence. The received signal is multiplied by PN sequences corresponding to respective channels generated by the PN generators 57, 57b in multipliers 56, 56' to be despread. The despread signals are accumulated for every one symbol length in accumulators 54, 54'. The accumulated results are decoded by decoders 55, 55' and subsequently supplied to the packet controller 90 as data packet signals for the respective traffic channels.

Figure 8A:
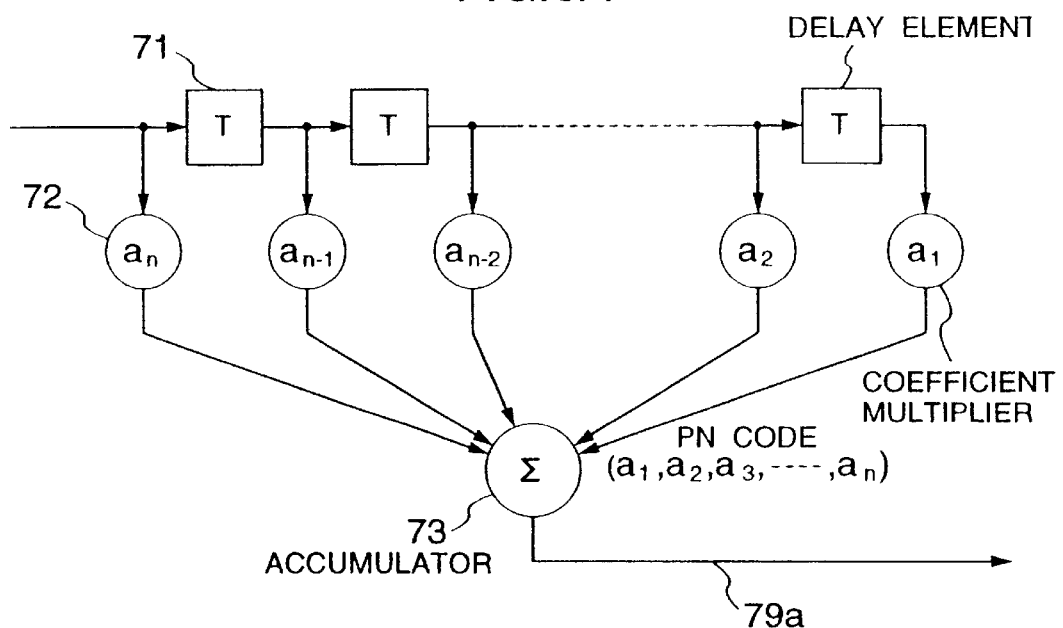
FIG. 8A is a block diagram illustrating the configuration of a matched filter 70.

FIG. 8A illustrates the principle of the matched filter 70a. The matched filter 70 is composed of a plurality of cascaded delay elements 71 each having a delay time T equal to a chip width of a PN sequence; a plurality of taps arranged on the input side of the delay element at the first stage and on the output side of the respective delay elements; and a plurality of coefficient multipliers 72, one in each tap. The matched filter 70a is configured such that received signals inputted at every chip time propagate from one tap to the next in the delay time T.

In the matched filter 70a for the reservation channel, the delay time of each delay element 71 is equal to the chip width of a PN sequence for the reservation channel, and the number of taps is equal to the number of chips included in one period of the PN sequence, such that a one-period portion of the PN sequence simultaneously appears at the plurality of taps at the time the top chip of an inputted signal reaches the rightmost tap. Therefore, respective chip values ("1" or "−1") of the PN sequence a1–an for the reservation channel are previously set in the respective coefficient multipliers 72 as coefficients, and a total sum of the results of multiplications of respective tap outputs by the respective coefficients is calculated by an accumulator 73. If the accumulation result is outputted as a correlation value between the received signal and the PN sequence for the reservation channel, the synchronization is acquired at the time the correlation value changing for every chip time presents a peak value. Also, the output value of the accumulator 73 at this time indicates a demodulated value generated by despeading the received signal.

In the present invention, the number of taps of the matched filter 70a is made equal to a spreading code length so that the output 79a of the matched filter 70a contains information (symbol code) of a one-bit portion of the reservation packet. Also, a short code type PN sequence having a less number of chips is applied as a spreading code for the reservation channel to reduce the number of taps required to the matched filter, thus facilitating the synchronization acquisition.

Figure 8B:
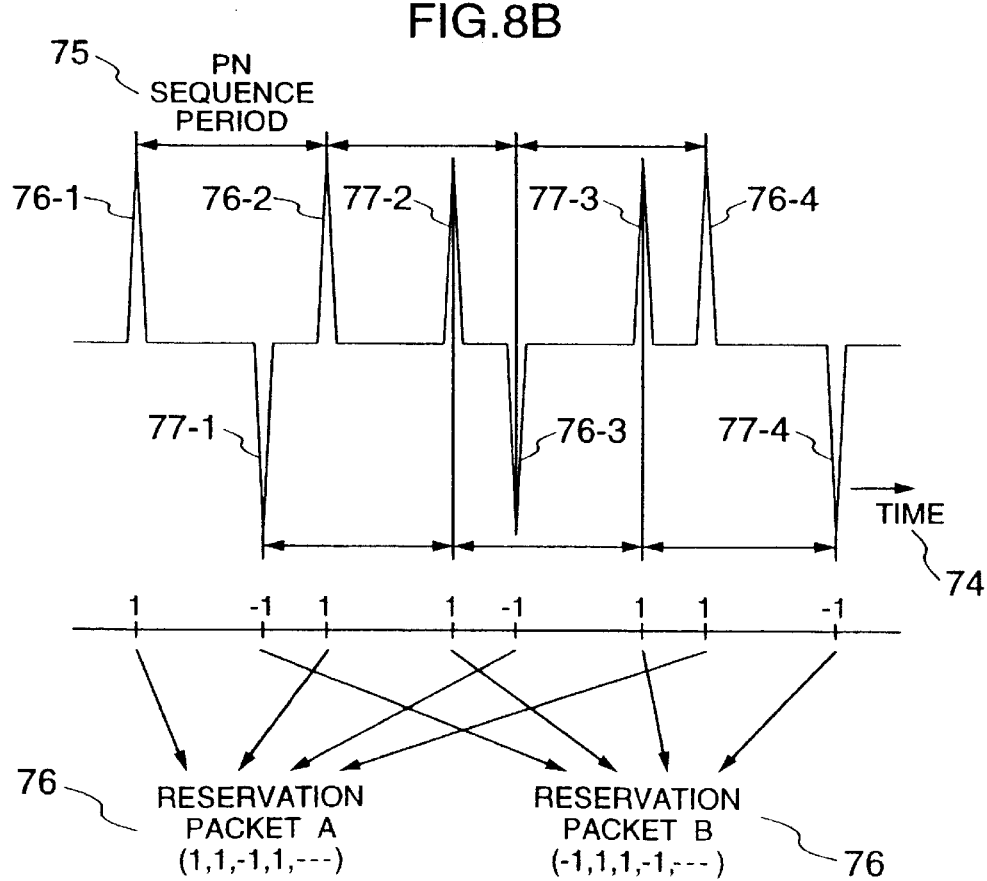
FIG. 8B is a diagram for explaining how the matched filter processes received reservation packets.

FIG. 8B illustrates an output signal of the matched filter 70a which is generated when two reservation packets A, B are partially overlapped on the time axis.

The output signal 79a of the matched filter 70a includes a plurality of positive peak values (indicative of a code bit "1") and a plurality of negative peak values (indicative of a code bit "0") generated by the accumulator 70a. Peak values equal to or more than a predetermined threshold are detected from the output of the matched filter 70a and grouped into groups of signals appearing at a time interval matching with the PN sequence period from the respective start points at which the first peak values are detected (synchronization acquisition time), thereby making it possible to identify a bit data train 78 belonging to the reservation packet A and a bit data train 76 belonging to the reservation packet B.

In the illustrated example, the peak value 76-1 appearing first is defined as the start point, and signal values ("1" or "−1") 76-2, 76-3, 76-4, . . . subsequently appearing at a time interval equal to the PN period 75 are extracted from the output of the matched filter 70a to reproduce the bit data train 76 constituting the reservation packet A. Also, a peak value 77-1 appearing asynchronously with the bit data train 76 is defined as the start point, and signal values ("1" or "−1") 77-2, 77-3, 77-4, . . . are extracted at a time interval equal to the PN period 75 are extracted from the output of the matched filter 70a to reproduce a bit data train 77 which constitutes the reservation packet B. By applying a similar principle, even if three or more reservation packets are transmitted in a time-overlapped condition, bit signals for each packet can be identified as long as a phase deviation over one chip or more exists between the respective packets.

Figure 9:
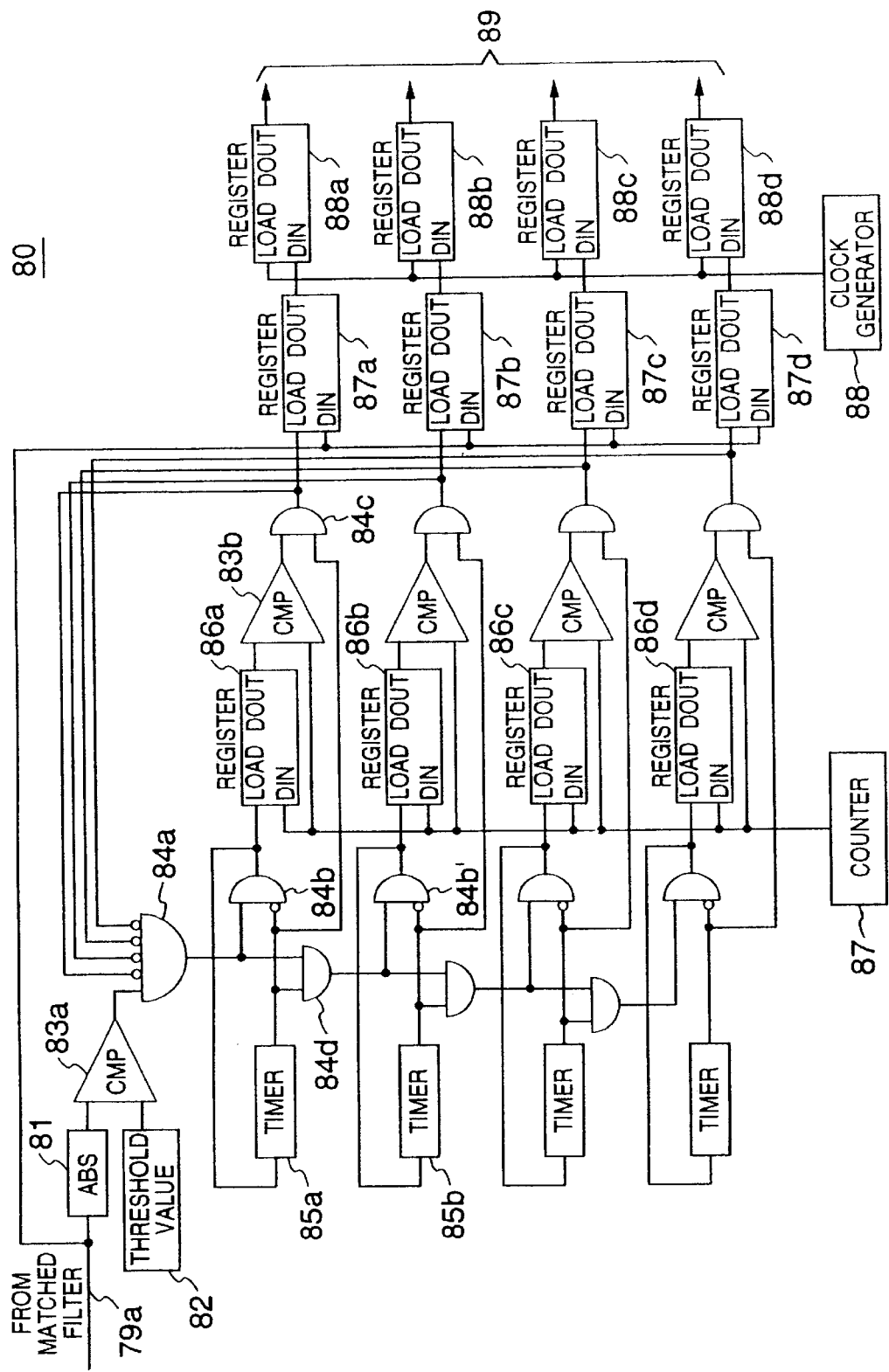
FIG. 9 is a block diagram illustrating the configuration of a packet separation circuit 80.

FIG. 9 illustrates an exemplary configuration of the packet separation circuit 80.

The output signal 79a of the matched filter 70a is inputted to an absolute value circuit (ABS) 81, the output of which is compared with a predetermined threshold outputted from a threshold circuit 82 by a comparator 83a. When the output of the absolute value circuit 81 is larger than the threshold, the output of the comparator 82 is turned ON ("1" state) and inputted to an AND circuit 84a. Since the AND circuit 84a is also supplied, as other input signals, with inverted signals which are initially OFF ("0" state), the AND circuit 84 is opened by the ON output from the comparator 83a, whereby its output signal is turned ON ("1" state). The ON output from the AND circuit 84A is inputted to AND circuits 84b and 84d.

The AND circuit 84b is also supplied at the other input terminal thereof with an inverted version of an output signal from a timer 85a. In an initial state, the output of the timer 85a is in OFF state ("0" state), so that the output of the AND circuit 84b is also turned ON at the time the output of the AND circuit 84a is turned ON. The ON output of the AND circuit 84b is inputted to a timing register 86a as an enable signal, whereby the timing register 86a is set at a value recorded on a counter 87 which performs a counting operation at an interval equal to the chip period of the PN code and returns to an initial value at an interval equal to the symbol length. The counter 87 outputs a value which indicates a chip position at the timing at which the synchronization is acquired, as previously described with reference to FIG. 8B.

The ON output of the AND circuit 84b causes a timer 85a to start for controlling the other input terminals of the AND circuits 84b and 84d. The timer 85a maintains its output in ON state for a time period corresponding to one reservation packet. This permits the AND gate 85d to remain open and the AND gate 84b to remain close until a time set in the timer 85a expires, thus preventing any other counted value from being set in the first timing register 86a.

If the next peak value is outputted from the matched filter 70a before the time set in the timer 85a expires, the ON output from the AND circuit 84a is inputted to an enable terminal of a second timing register 86b through a pair of AND circuits 84d and 84d' which remain open. As a result, the output value of the counter 87 is set in the second register 86b. At this time, a timer 85b cooperating with the second timing register 86b is started and performs a similar operation to that of the timer 85a to prohibit any other value from being set in the second timing register 86 until a one-packet period has elapsed and to open a pair of AND gates at the next stage so as to input the subsequently generated enable signal to a third timing register 86c.

In this embodiment, since the packet separation circuit 80 is provided with four timing registers 86a–86d, the synchronization acquisition timing is stored for four reservation packets, determined by the order of generation, within a plurality of reservation packets generated in a time-overlapped condition by repeating the foregoing operations in a similar manner.

The value of the synchronization acquisition timing set in the timing register 86a is compared with an output value of the counter 87 in a comparator 83b. Every time the counted value is coincident with the synchronization acquisition timing value set in the timing register 86a, the output of the comparator 83b is turned ON.

The ON output of the comparator 83b is inputted to an enable terminal of a data register 87a through the AND circuit 84c which remains open while the timer 85a is in ON state. As a result, the data register 87a is supplied with the output of the matched filter 80a at the synchronization acquisition timing. The remaining timing registers 86b–86d also operate in a manner similar to the foregoing to store the outputs of the matched filter 70a for respective reservation packets in data registers 87b–87d, respectively.

Since the data registers 87a–87d are supplied with data in accordance with the synchronization acquisition timing of the respective reservation packets, the contents of these data registers 87a–87d are transferred to output registers 88a–88d, respectively, in synchronism with a clock having a bit period generated by a clock generator 88, and data indicative of the contents of the respective reservation packets are transferred to the decoder 55a illustrated in FIG. 7 from the output registers 88a–88d.

Figure 10:
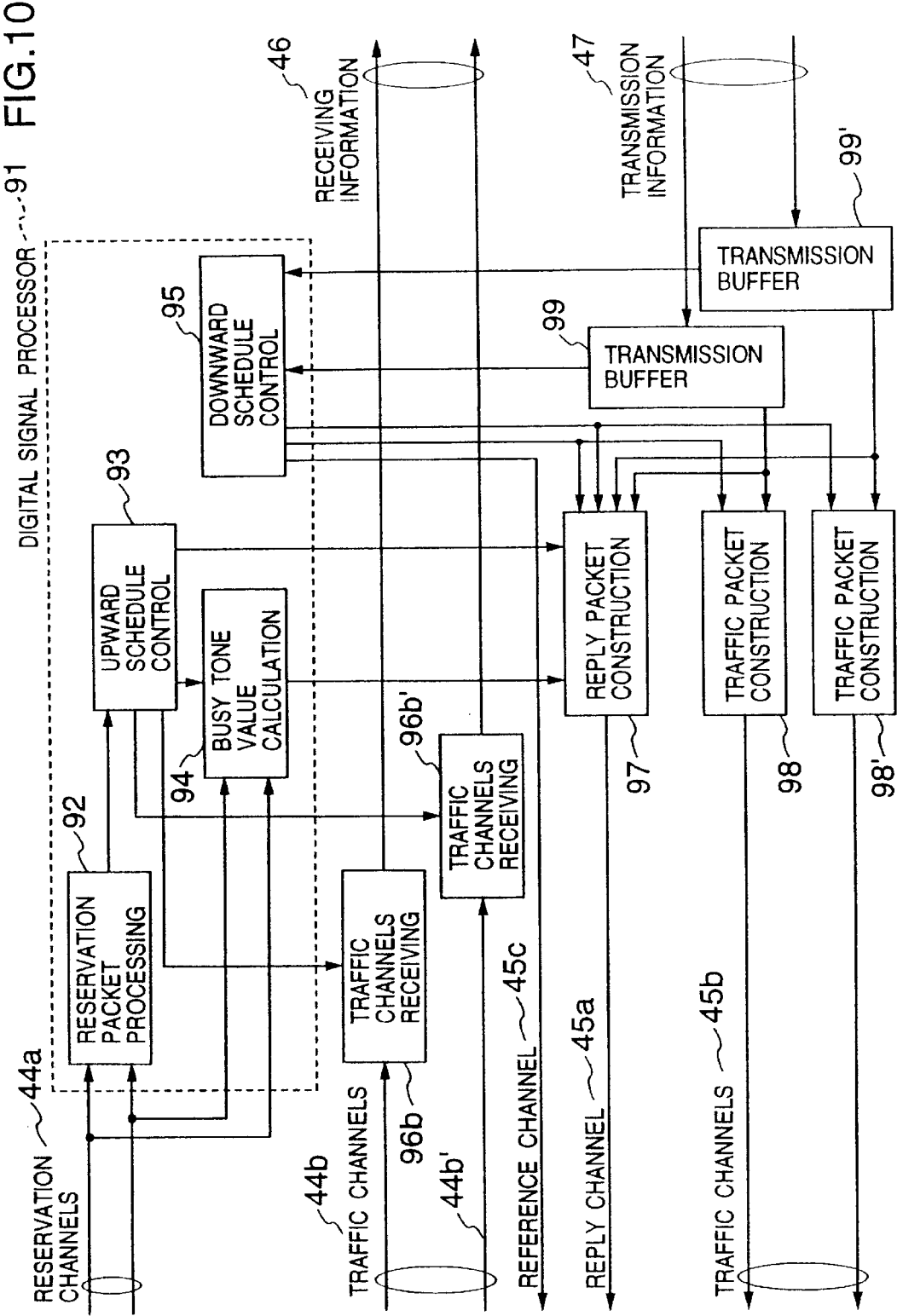
FIG. 10 is a block diagram illustrating the configuration of a packet controller 90 in the base station.

FIG. 10 illustrates an exemplary configuration of the packet controller 90 in the base station 4.

Received data from the reservation channel (the contents of a reservation packet) is inputted to a digital signal processor (DSP) 91, and is processed by a reservation packet processing routine 92 of the DSP 91. Subsequently, an assignment of a traffic channel and a time slot (scheduling) is performed by an upward schedule control routine 93.

A traffic channel (PN type) and a time slot (timing information) determined by the upward schedule control routine 93 is transferred to a reply packet constructing unit 97 together with a source address of a reservation packet to which a reply packet is destined. The reply packet constructing unit 97 generates a reply packet including the above information and transmits it to the reply channel signal line 45a. In this way, the operation for transmitting an upward data packet from each mobile terminal can be controlled in accordance with the scheduling of the base station.

Received data from respective traffic channels are inputted to reception processing units 96b, 96b' arranged in correspondence co the respective traffic channels through signal lines 44b, 44b', and transferred to the BSC interface 42 through signal lines 46 as received data packets.

On the other hand, a downward data packets outputted from the BSC interface 42 to signal lines 47, after temporarily stored in transmission buffers 99, 99', are transmitted under the control of a schedule executed by a downward schedule control routine 95 of the DSP 91. More specifically, in accordance with a downward schedule, a reply packet constructed by the reply packet constructing unit 97 is first sent from the reply channel, and subsequently data packets generated by the traffic packet constructing units 98a, 98a' are sent in predetermined time slots on traffic channels determined by the downward schedule.

In this embodiment, for restraining mobile terminals from issuing reservation packets when the traffic channels remain busy, a busy tone value calculation routine 94 of the DSP 91 generates busy tone information in accordance with the number of reservation packets received through the reservation channel and traffic channel utilization state information known to the upward schedule control routine 93, and notifies the busy tone information to the respective mobile terminals through the reply channel 45a.

Figure 11:
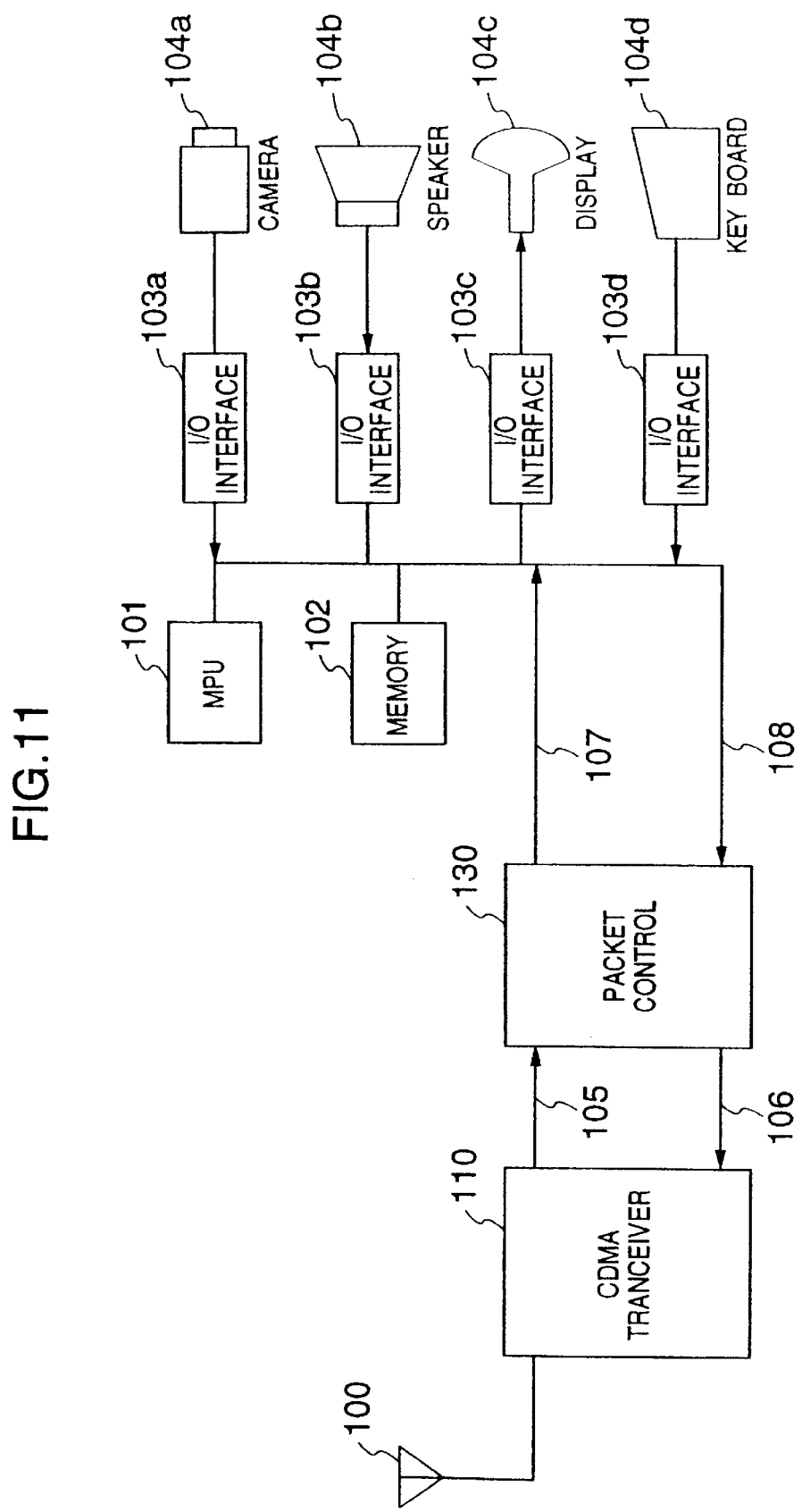
FIG. 11 is a block diagram illustrating the configuration of a mobile terminal.

FIG. 11 illustrates the configuration of the radio terminal 5.

The radio terminal 5 is composed of an antenna 100; a CDMA transceiver 110 connected to the antenna 100; a packet controller 130 connected to the CDMA transceiver 110; and a data processing unit connected to the packet controller 130.

The data processing unit comprises a microprocessor (MPU) 101; a memory 102 for storing data and programs; and a plurality of input/output devices connected to an internal bus through an I/O interface 103. The input/output devices may comprise, for example, a camera 104a, a speaker 104b, a display 104c, a keyboard 104, and so on.

Figure 12:
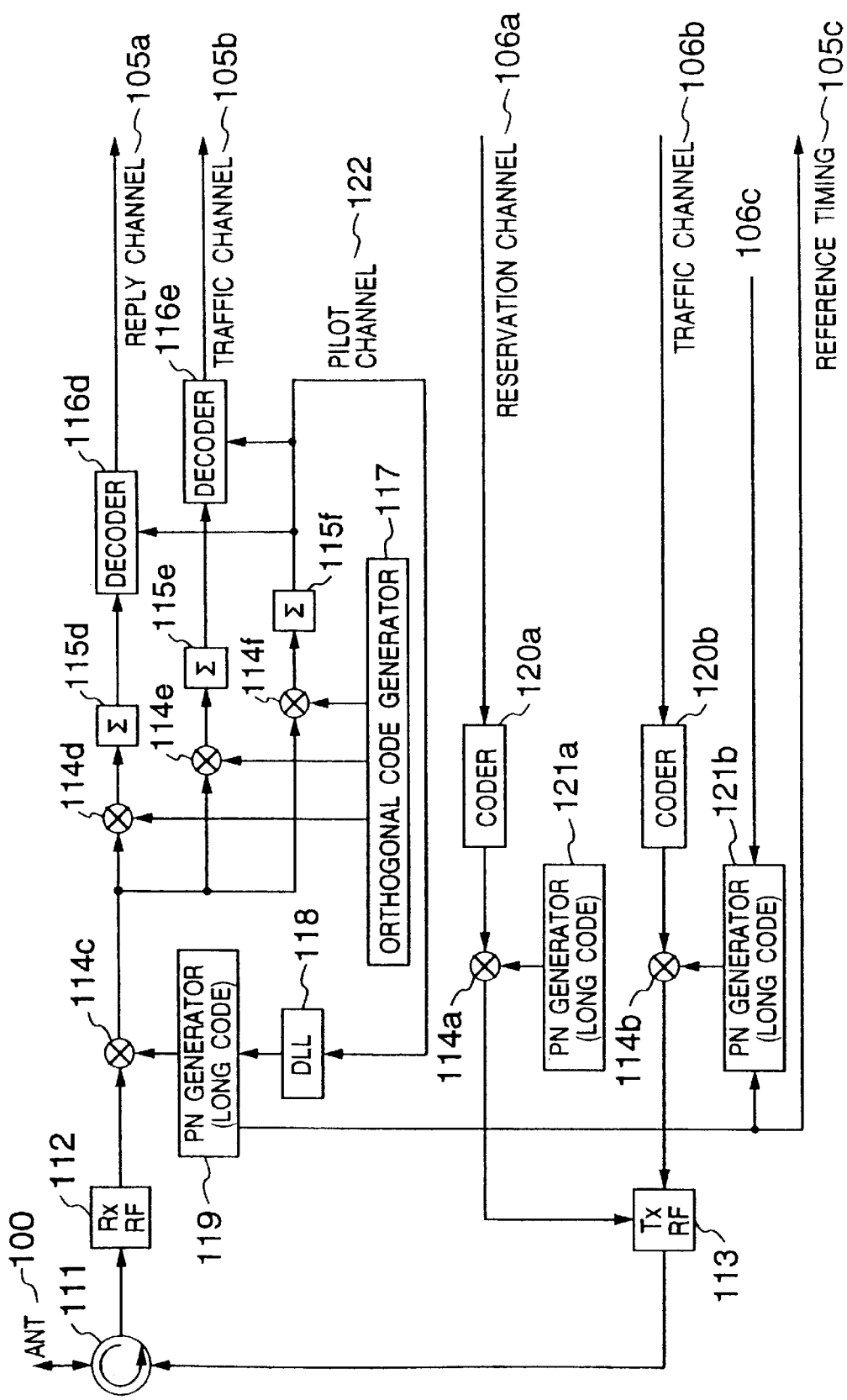
FIG. 12 is a block diagram illustrating the configuration of a CDMA transceiver 110 in the mobile terminal.

FIG. 12 illustrates in detail the configuration of the CDMA transceiver 110 in the radio terminal.

The CDMA transceiver 110 comprises a receiving radio module 112 and a transmitting radio module 113. These modules are responsible for modulation or demodulation of a-baseband signal and a receiving process or a transmitting process at radio frequencies.

In a transmitter circuit, a reservation packet signal outputted to a reservation channel signal line 106a is encoded for error correction in an encoder 120a, and then multiplied by a unique PN sequence (short code) generated from a PN generator 121a in a multiplier 114a to generate a spread-spectrum reservation packet signal which is sent to the transmitting radio module 113.

On the other hand, a data packet outputted to a traffic channel signal line 106b is encoded for error correction in an encoder 120b, and multiplied by a PN sequence (long code) generated by a PN generator 121b in a multiplier 114b to generate a spread-spectrum data packet which is sent to the transmitting radio module 113. The spread-spectrum for the data packet is performed using a PN sequence specified by a base station, which is identified by a control signal outputted onto a signal line 106c by a packet controller 130 and in synchronism with reference timing 105c provided from a PN generator 119 in a receiver circuit.

In the receiver circuit, a received signal outputted from the receiving radio module 112 is inputted to a multiplier 114c which multiplies the received signal by a PN code unique to the base station generated by the PN generator 119 to despread the received signal. The output of the multiplier 114c is parallelly inputted to multipliers 114d, 114e and 114f respectively for the reply channel, traffic channels and pilot channel, and multiplied by orthogonal codes unique to the respective channels generated by an orthogonal code generator 117.

On a reply channel line 105a and a traffic channel line 105b, output signals from the multipliers 114d 114e are inputted to accumulators 115d, 115e, respectively, to produce accumulated values for each symbol length for despreading the output signals from the multipliers 114d, 114e. Output signals of the respective accumulators 115d, 115e are inputted to decoders 116d, 116e, respectively, for error correction, and then transferred to the packet controller 130 through signal lines 105d, 105e, respectively.

On a pilot channel line 122, a pilot signal outputted from an accumulator 115f is inputted to a DLL (Delay Locked Loop) circuit 118 for tracking of synchronization. The PN generator 119 is forced to generate a PN sequence in synchronism with the output of the DLL circuit 118. It should be noted that the decoders 116d, 116e on the reply channel line 105a and the traffic channel line 105b are operated in synchronism with the pilot signal outputted from the accumulator 115f.

FIG. 13 illustrates an exemplary configuration of the packet controller 130 in the radio terminal.

Received data through the reply channel appearing on the signal line 105a is inputted to a DSP 131 and precessed by a monitoring routine 132. The contents of the reply packet is supplied to an upward schedule control routine 134 and to a downward schedule control routine 135, while a busy tone signal received through the reply channel is supplied to a busy tone calculation routine 133.

Received data through a traffic channel appearing on the signal line 105b is received by a reception processing circuit 136 which is controlled by a control signal from the downward schedule control routine 135 and a reference timing signal 105c, and received data in a particular time slot specified by a base station through a reply packet is outputted onto a signal line 107 as receiving information.

On the other hand, transmission data from the radio terminal, after temporarily stored in a transmission buffer 138, is fetched by a traffic packet constructing unit 139 in accordance with an instruction from the upward schedule control routine 134, and is sent onto the traffic channel signal line 106b as a data packet.

When a reply packet is received from a base station, the upward schedule control routine 134 generates a signal 106 for specifying a traffic channel (PN sequence) to which a traffic packet is to be sent, and issues a data packet sending instruction to the traffic packet constructing unit 139 at timing of a time slot specified by the base station. The traffic packet constructing unit 139, upon receiving the data packet sending instruction from the control routine 134, reads transmission data from the transmission buffer 138, and sends the data packet illustrated in FIG. 5C onto the traffic channel signal line 106b at predetermined output timing determined based on the reference timing signal 105c.

The busy tone value calculation routine 133 calculates a busy tone value indicative of a traffic situation from a busy tone signal received through the reply channel, and notifies the busy tone value to the upward schedule control routine 134.

The upward schedule control routine 134 controls the generation of reservation packets in accordance with the traffic situation. For example, if the busy tone signal does not indicate to restrain data transmission with transmission data being accumulated in the transmission buffer, the reservation packet constructing unit 137 is started at arbitrary timing to transmit a reservation packet to the reservation channel signal line 106a. Conversely, if the busy tone signal indicates to restrain data transmission, the transmission of reservation packets is restrained until the traffic situation improves.

As described above, in this embodiment, the CDMA scheme is applied to the reservation channel to reduce the possibility of retransmission of reservation packets due to collision of the reservation packets even if respective mobile terminals transmit the reservation packets at arbitrary timing. Moreover, the busy tone control is added to restrain the transmission of new packets from mobile terminals when the traffic channels or the reservation channel is in an overload condition.

The CDMA has a problem that when a plurality of packets are generated in a time overlapped condition, the packet signals mutually affect as noise, so that if a large number of packets are simultaneously generated, the receiver side cannot identify them because all packet signals are buried in noise. As described above, in the mobile communication system of the present invention comprising a reservation channel, a reply channel and a plurality of traffic channels, the total number of reply packets and data packets can be controlled by the scheduling function of the base station, whereas the base station cannot directly control reservation packets since they are issued autonomously from respective mobile terminals.

As described above, a method which allows each radio terminal to autonomously control the transmission of a reservation packet with reference to the busy tone signal from the base station is effective in avoiding concentrated reservation packets to smoothly control the transmission in each terminal.

While the busy tone signal may be transmitted through a channel dedicated thereto, empty time zones appearing periodically on the reply channel may also be utilized.

The reply channel, as shown in FIG. 2, is divided into time slots each having a length corresponding to the length of a data packet on the traffic channel based on the pilot signal. Since the reply packet includes a smaller amount of information, its length can be made shorter than the data packet. For example, assuming that the time slot length (data packet length) is 512 bits and the reply packet length is 42 bits, 12 reply packets can be transmitted through the reply channel during one time slot period on the traffic channel, with a 8-bit empty time zone remaining at the end of the time slot. It is therefore possible to utilize the available empty time zone in the time slot to periodically transmit the busy tone signal through the reply channel.

Next, a reservation packet restraining method using the busy tone signal transmitted in an empty time zone on the reply channel will be described with reference to FIGS. 14A, 14B.

Figure 14A:
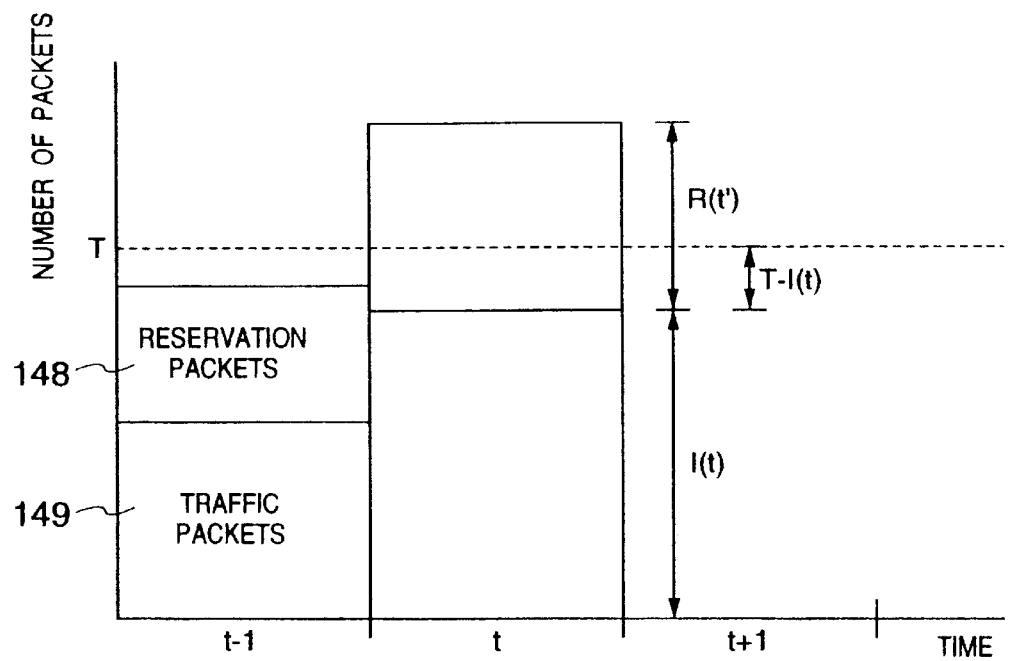
FIGS. 14A and 14B are diagrams for explaining a busy tone control.
Figure 14B:
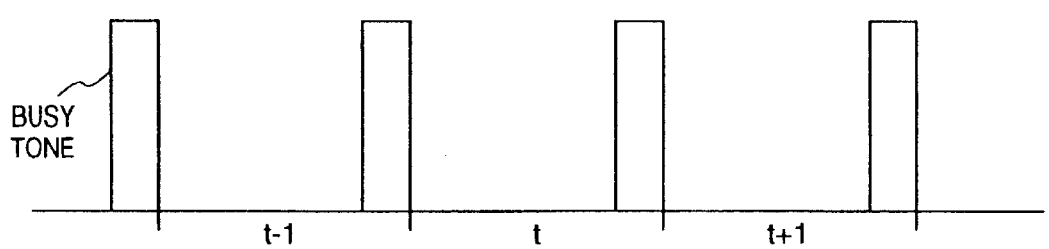

In FIG. 14B, "t−1", "t" and "t+1" designate time slot numbers on the reply channel, and a pulse waveform represents the busy tone signal 143. The busy tone signal 143 is periodically transmitted utilizing an empty time zone left in each time slot on the reply channel.

FIG. 14A shows a relationship between a total amount of packets sent out by radio terminals in each time slot and a number T of allowed packets which can be transmitted in a time-overlapped condition. An area 148 indicates an amount of reservation packets sent in the time slot "t−1" and an area 149 indicates an amount of data packets sent in the time slot "t−1".

In the following, the busy tone signal generated by the base station in the time slot "t−1" will be described, assuming that a number of transmitted data packets during the time slot "t" is I(t), a number of transmitted reservation packets is R(t), a number of transmission requested reservation packets is R(t)', and a transmission probability of reservation packets is P(t). Further, R(t)' and R(t) are defined to be numbers of reservation packets when the length of the reservation packet is normalized by the length of the data packet.

First, assume the following equation (1):

$$R(t)' = \frac{R(t-1)}{P(t-1)} \tag{1}$$

Assuming that the number R(t)' of transmission requested reservation packets possessed by all radio terminals in the service area of a base station in the time slot "t" is equal to a number R(t−1)' of transmission requested reservation packets in the previous time slot "t−1", the equation (1) is derived by substituting a number R(t−1) of reservation packets actually received by the base station as the value of R(t−1)'. To the base station, the number I(t) of data packets in the time slot "t" is known from previously received reservation packets and the result of scheduling the traffic channels for received data packets from other base stations.

Thus, the value of R(t)' is estimated from the equation (1), and when a total amount of the number R(t)' of transmission requested reservation packets and the number I(t) of data packets in the time slot "t" exceeds a tolerable value T as shown by the following equation (2), the transmission of reservation packets is restrained by the busy tone signal:

$$I(t)+R(t)' \geq T \tag{2}$$

In this event, the transmission of reservation packets is controlled by the busy tone signal such that the transmission probability P(t) of reservation packets from radio terminals in the service area is restrained by a traffic amount on the traffic channels, as shown by the following equation (3), thereby making the sum of the number of reservation packets and the number of data packets substantially equal to the tolerable value T. Since the number of reservation packets actually transmitted from radio terminals is determined from the probability, it is desirable that the tolerable value T be set at a slightly lower level in order to allow for a certain margin.

$$P(t) = \frac{\{T - I(t)\}}{R(t)'} \tag{3}$$

On the other hand, if a total amount of packets estimated in the time slot "t" is in a relationship expressed by the following equation (4), the transmission of reservation packets is controlled by the busy tone signal such that the transmission probability P(t) follows the equation (5), thus allowing all radio terminals to freely transmit reservation packets.

$$I(t)+R(t)' < T \tag{4}$$

$$P(t)=1.0 \tag{5}$$

The base station may notify respective radio terminals of information indicative of the transmission probability expressed by the equation (3) or (4) as the busy tone signal 143 in the time slot "t−1".

As will be apparent from the foregoing description, the present invention applies CDMA to a reservation based packet access control type mobile communication system to reduce the possibility of retransmission of reservation packets due to their collision, even if each mobile terminal is allowed to transmit a reservation packet at its arbitrary timing, to improve the throughput.

According to the present invention, for example, a short spreading code is applied to a reservation packet, and the synchronization is acquired on the base station side using a matched filter, so that even if a plurality of mobile terminals transmit reservation packets asynchronously to each other, the base station can identify the respective reservation packets at a high speed. Also, a reduced local address (own address) shorter than an original address number or a link number (destination address) is used for terminal address information set to each packet, so that the transmission efficiency can be improved. Further, when each terminal is allowed to control the transmission of reservation packets in accordance with a busy tone signal from a base station, it is possible to avoid an excessive amount of reservation packets simultaneously communicated on a channel, thus ensuring a favorable communication environment.

It is to be understood that the above-described embodiments are merely illustrative of the principles of the invention and that may variations may be devised by those skilled in the art without departing from the spirit and scope of the invention. It is therefore intended that such variations be included within the scope of the claims.

What is claimed is:

1. A communication system comprising:
   a base station;
   a plurality of mobile terminals;
   a reservation channel formed between said base station and said mobile terminals defined in accordance with a Code Division Multiple Access (CDMA) scheme utilizing a spreading code; and
   a plurality of traffic channels formed between said base station and said mobile terminals defined in accordance with said CDMA scheme utilizing a plurality of spreading codes, wherein time slots are defined on each of said traffic channels,
   wherein one of said mobile terminals transmits a request for an assignment of a time slot or a plurality of time slots on a traffic channel defined by one of said spreading codes by transmitting a reservation packet to said base station through said reservation channel, and
   wherein one of said mobile terminals, upon receiving from said base station a reply to the request, performs packet communication using an assigned time slot or a plurality of assigned time slots on the traffic channel determined based on the reply.

2. A communication system according to claim 1, wherein an assignment of a traffic channel is requested with the reservation packet.

3. A communication system according to claim 1, wherein said base station continually transmits a pilot signal through a pilot channel, and one of said mobile terminals extracts a synchronization signal by monitoring the pilot signal and sets a time slot on said traffic channel.

4. A communication system according to claim 1, wherein said mobile terminals spread the reservation packet using a single spreading code.

5. A terminal which requests an assignment of a time slot or a plurality of time slots defined on a traffic channel formed between said terminal and a base station by transmitting a reservation packet to the base station through a reservation channel, the traffic channel having a plurality of time slots and being one of a plurality of traffic channels formed between the base station and a plurality of said terminals,
   wherein said terminal receives a reply and uses the time slot or the time slots to perform data communications,
   wherein a Code Division Multiple Access (CDMA) scheme utilizing one of a plurality of spreading codes defines each of the traffic channels, and
   wherein the COMA scheme utilizing a spreading code defines the reservation channel.

6. A terminal according to claim 5, which further requests an assignment of a traffic channel with the reservation packet.

7. A terminal according to claim 5, which further performs packet communication using the assigned time slot or the assigned time slots on the traffic channel determined based on the reply from the base station.

8. A terminal according to claim 7, which further extracts a synchronization signal by monitoring a pilot signal transmitted from the base station through a pilot channel and sets time slots on the traffic channel.

9. A base station which receives a request from a terminal for an assignment of a time slot or a plurality of time slots defined on a traffic channel included in a plurality of traffic channels, said request being provided by a reservation packet transmitted from the terminal through a reservation channel, and said base station, after transmitting towards the terminal a reply to the reservation packet wherein each of the traffic channels have a plurality of time slots, performs data packet communication with the terminal using the assigned time slot or the assigned time slots on the traffic channel determined based on the reply, wherein a code division multiple access (CDMA) scheme utilizing one of a plurality of spreading codes defines each of the traffic channels, and wherein a CDMA scheme utilizing a spreading code defines the reservation channel.

10. A base station according to claim 9, which notifies a traffic channel assignment with the reply.

* * * * *